UNITED STATES PATENT OFFICE.

CHARLES EUGENE BRUCE SEYFFERTH, OF TROISDORF, GERMANY.

PROCESS FOR UTILIZING THE WASHWATER OF THE MANUFACTURE OF NITROCELLULOSE.

1,248,933. Specification of Letters Patent. Patented Dec. 4, 1917.

No Drawing. Application filed July 22, 1915. Serial No. 41,250.

*To all whom it may concern:*

Be it known that I, CHARLES EUGENE BRUCE SEYFFERTH, citizen (subject) of Germany, residing at Troisdorf, Germany, have invented a new and useful Process for Utilizing the Washwater of the Manufacture of Nitrocellulose, and do hereby declare the following to be a full, clear, and exact description of the same.

This invention relates to a process for utilizing the wash-water of the manufacture of nitro cellulose.

Previous to this invention all the wash-water in the manufacture of nitro cellulose went to waste. The nitrifying acid which, after the nitrifying process, has not been removed from the product by mechanical separation, pressure, centrifugal force or the like, remains in the product and, when the product is washed, this acid is taken over by the wash-water and goes into the waste. Heretofore very considerable quantities of acid have been lost in this way, the recovery of which involves great economical progress, taking into consideration that the quantity of acid lost in the wash-water is about twice or three times as great as the quantity required for the manufacture of the various kinds of nitro cellulose.

It is the object of this invention to prevent these losses and to recover the acid which previously was lost in the wash-water, and this object is achieved by the invention.

For this purpose the percentage of acid contained in the wash-water is increased, in a suitable manner, for instance by using the wash-water from a first charge of the product for washing a second charge of nitro cellulose, until a wash-water of such a concentration is obtained that it can be economically treated for the separation and recovery of nitric acid and sulfuric acid.

According to this invention, for the treatment of the wash-water, one of the known processes for separating nitric acid from sulfuric acid may be applied, for instance:

The nitric acid which is contained in the wash-water is transformed into nitric oxid by reducing agents, for instance, sulfate of iron and sulfuric acid, and the nitric oxid is used for the manufacture of nitric acid in a similar manner as in the manufacture of the latter from air, or by other processes.

The products of the reactions, as for instance oxy-salts, are transformed by suitable reducing agents, as for instance iron, into protoxid-salts, and as such re-introduced into the cyclic manufacturing process, so that unlimited quantities of nitric acid can be transformed into nitric oxid by the same quantity of reducing agent. The resulting excess of reducing agent is recovered and made technically useful again.

Instead of treating the acid wash-water for reduction of nitric acid therein contained, and for recovery of the latter, at the same time utilizing the sulfuric acid, the acids may be separated from each other by distillation, and the nitric acid which is recovered by the distillation may be directly used again for the manufacture of nitro cellulose, after it has been mixed with sulfuric acid of suitable concentration.

I claim as my invention:—

1. A process for utilizing the wash-water from the manufacture of nitro cellulose, which consists in increasing the percentage of acid contained in the wash-water by using the same water repeatedly for washing nitro cellulose containing adhering acid and treating the enriched water for separating and recovering the nitric acid and sulfuric acid therefrom.

2. A process for utilizing the acid of wash-water from the manufacture of nitro cellulose, which consists in washing with the same wash-water successive charges of nitro cellulose containing adhering nitric and sulfuric acids and which are relatively progressively stronger in acid, whereby the wash-water is increasingly acidulated; and separating and recovering the nitric and sulfuric acids from the concentrated wash-water.

In testimony whereof, I have signed my name to this specification in the presence of two subscribing witnesses.

CHARLES EUGENE BRUCE SEYFFERTH.

Witnesses:
J. D. ZIESECKE,
SCHULTE.